March 26, 1946.  F. SACO, JR., ET AL  2,397,208
WASTE HEAT UTILIZER
Filed Feb. 21, 1941  2 Sheets-Sheet 1
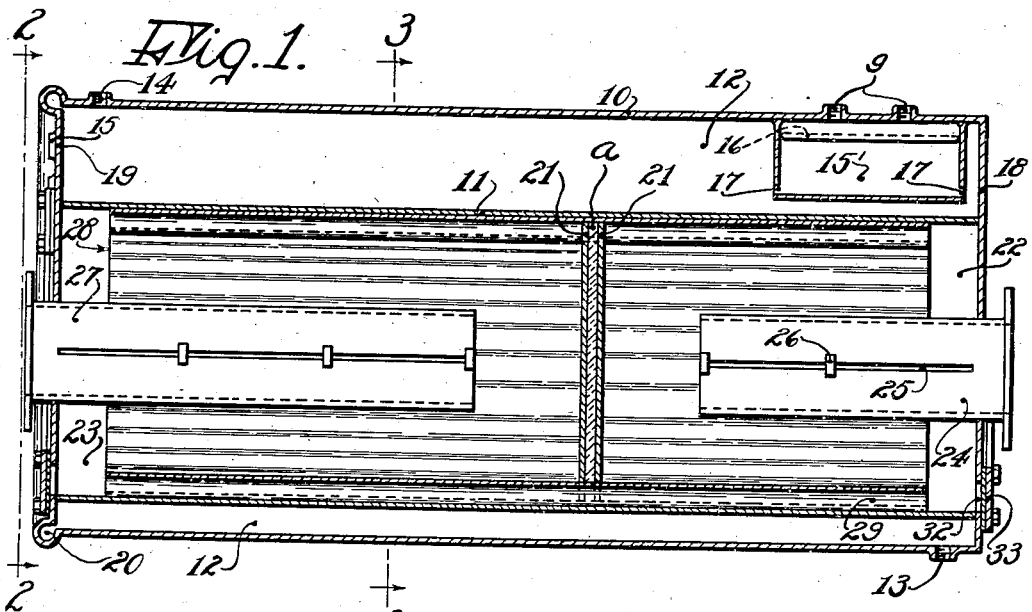
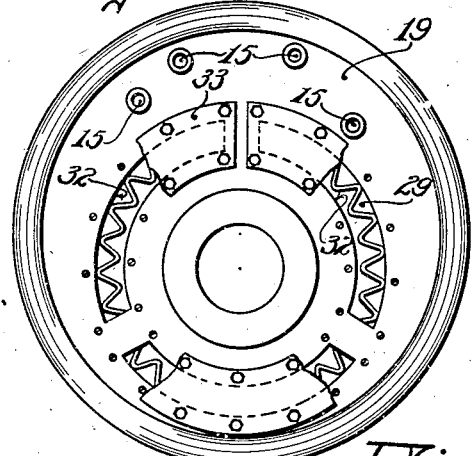
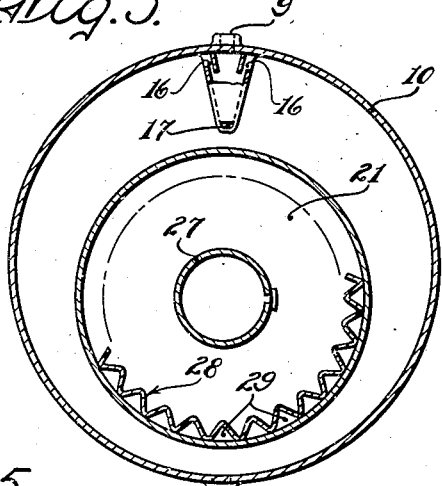
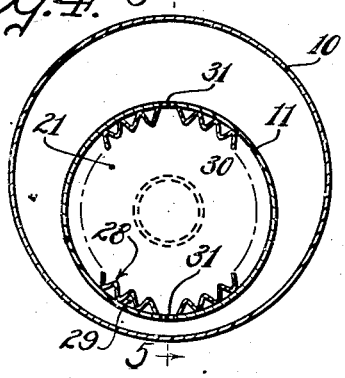
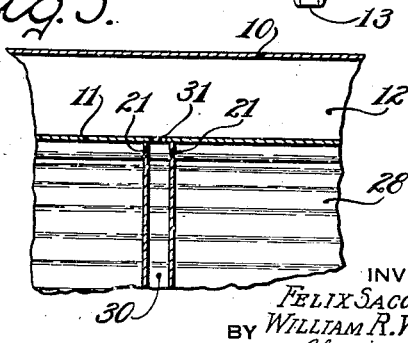
INVENTOR
FELIX SACO, JR. AND
BY WILLIAM R. WILLIAMSON
Chapin & Neal
ATTORNEYS March 26, 1946. F. SACO, JR., ET AL 2,397,208
WASTE HEAT UTILIZER
Filed Feb. 21, 1941 2 Sheets-Sheet 2
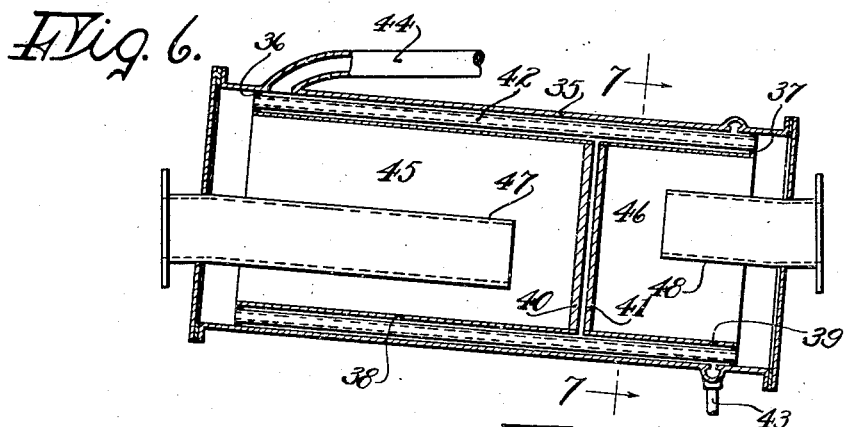
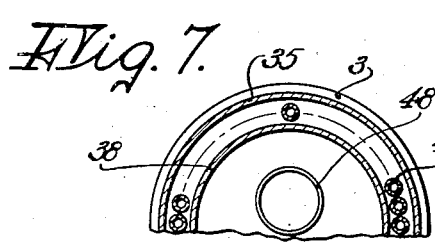
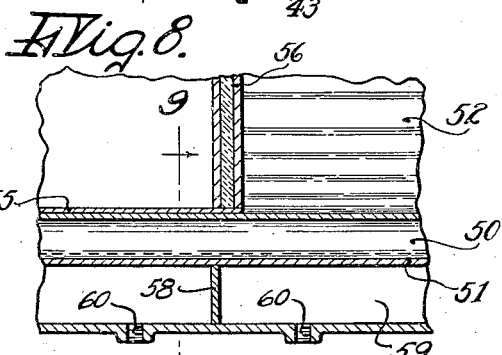
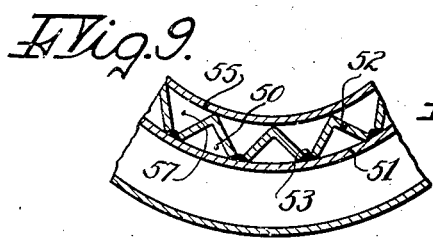
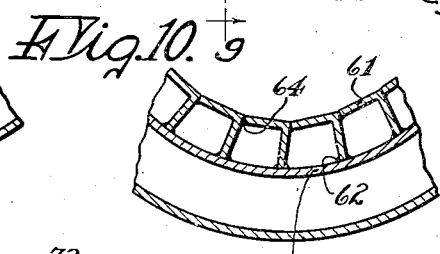
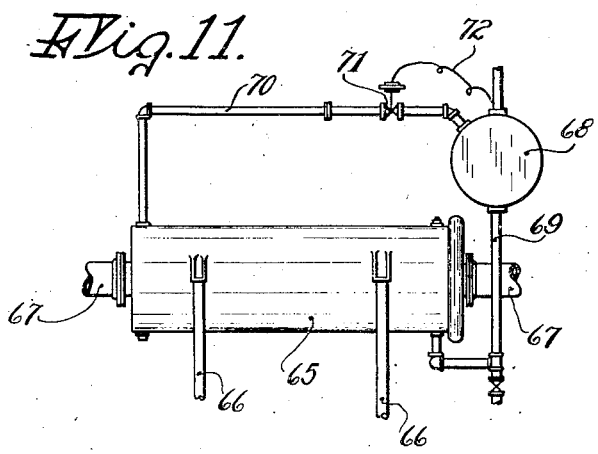
INVENTORS
FELIX SACO, JR. AND
BY WILLIAM R. WILLIAMSON
Chapin & Neal
ATTORNEYS Patented Mar. 26, 1946

2,397,208

UNITED STATES PATENT OFFICE 2,397,208

WASTE HEAT UTILIZER

Felix Saco, Jr., West Hartford, Conn., and William R. Williamson, Valley Stream, N. Y., assignors to The Maxim Silencer Company, Hartford, Conn., a corporation of Connecticut Application February 21, 1941, Serial No. 380,022

11 Claims. (Cl. 257—16)

This invention relates to apparatus for utilizing the waste heat of the exhaust gases from internal combustion motors and preferably for simultaneously acting as a silencing means. One object of the invention is to provide an improved heat transferring structure which will remove heat rapidly from the exhaust gases without substantially raising their back pressure or interfering with the silencing action of the device. A further object is to construct the device so that the amount of water to be heated or vaporized may be varied in accordance with the output of water or steam desired, even to the point of running the apparatus with no water at all in the jackets without straining the tightness of the assembly. A further object is to increase the silencing efficiency of the device by coordinating the removal of heat from the exhaust gases with the expansion of the gases and the intermingling of positions of the gases under different pressure conditions.

Other and further objects will appear from the following description and claims.

Referring to the drawings:

Fig. 1 is a median section of the device;

Fig. 2 is an end view taken on line 2—2 of Fig. 1;

Fig. 3 is a section on line 3—3 of Fig. 1;

Fig. 4 is a transverse sectional view taken between the partition walls showing a modified partition structure;

Fig. 5 is a fragmentary sectional view substantially on line 5—5 of Fig. 4;

Fig. 6 is a median section of a modification;

Fig. 7 is a fragmentary transverse section thereof on line 7—7 of Fig. 6;

Fig. 8 is a fragmentary median section of a modification;

Figs. 9 and 10 are detail sections showing alternative methods of constructing certain passages; and Fig. 11 is a diagram of a preferred form of connection.

The device is in one embodiment formed of an outer cylindrical shell 10 and an inner cylindrical shell 11 spaced from it and positioned as shown in an eccentric position with respect to it. The eccentric position of the shells is particularly useful when the device is to convert water to steam; if it is to be used as a hot water heater the shells may be made concentric. The space 12 between these two shells forms a water jacket to which water is fed through an opening 13. Various openings 14, 15 may serve to receive gauges, try cocks, etc. Steam is removed through one of two openings 9 leading into a baffled chamber 15', the other of the openings being provided to accommodate the usual safety valve. Preferably the chamber 15' is formed of wall members having steam inlet ports 16 opening from space 12 near the outer shell, and a water drain 17 at each end at the lower side. It will be understood that openings 14, 15 or 9 when not needed for use will be suitably plugged. To the inner shell 11 is secured, as by welding, an end header 18 and a second end header 19. The outer shell 10 is secured in fixed relation to the header 18 and is secured to the header 19 by a toric connection 20 which permits the cool outer shell and the warmer inner shell to move relatively to each other. The connection 20 may conveniently be formed by a tube bent into circular form, slit, and then welded to the shell 10 and the header 19. It is particularly useful where the device is to be run dry as a silencer only, there being in this case a considerable difference between the temperatures of the inner shell 11, which is fastened rigidly to both headers 18 and 19, and the outer shell 10, which is fastened rigidly to the header 18 and through the connection 20 to header 19.

Transversely across the inner shell is a partition preferably formed of two spaced plates 21 separated by a layer of heat insulating material such as asbestos indicated at $a$. This partition divides the interior of the inner shell into two chambers 22 and 23 which are preferably of different lengths. Extending through the header 18 is a tube 24 which is preferably formed with a slot 25 bridged by spacing members 26. The tube preferably extends the major portion of the length of the right hand chamber and is open at its inner end as well as along the slot 25. A similar tube 27 extends through the header 19 and is constructed in a similar manner.

In order to permit gases to pass from one chamber to the other, a metal structure 28 forming a plurality of conduits is located around the inner surface of the inner shell, the walls of the conduits also acting as extended heating surfaces in heat conducting relation to the shell 11 and projecting into the hot gas. This structure extends past the partition and throughout the major portion of the length of each of the chambers, providing passages 29 between the chambers. In mufflers of small size this structure may be formed of corrugated metal welded or otherwise secured in place, while in the larger sizes it is preferably formed of angle irons (Figs. 9 and 10) placed with their open sides against the inner wall of the shell and welded to it and to each other.

Gas entering through tube 27 passes out through its open end and also through the lateral escape openings formed in its wall to the surrounding chamber and passes therefrom through the spaces 29 between the corrugated metal structure and the inner shell 11 to the other chamber and thence out through the other tube 24. By this means the warm gases are given a substantial travel in intimate contact with the inner shell 11 and are cooled by water within the water jacket surrounding it. This secures a very efficient cooling for gases and therefore increases the silencing effect of the muffler, and at the same time permits the waste heat in the exhaust gases to be utilized.

In order to prevent transfer of heat between the two chambers, the heat insulating layer of asbestos is preferably located between the two central plates 21. Instead of this arrangement, it is possible to use a space between the two plates 21 as shown at 30 in Figs. 4 and 5, this space being connected to the water jacket by holes 31 permitting the cooling water to circulate between the plates. Without some such arrangement it has been found that the gases in the second chamber may actually be warmer than those passing through the space between the corrugated metal structure and the inner shell. For facility in cleaning, the end headers 18 and 19 are preferably provided with arcuate openings 32 giving endwise access to the corrugated structure 28, the openings 32 being closed by plates 33 bolted or otherwise detachably secured to the headers.

It is preferable to use the longer of the two chambers 22 and 23 as the inlet chamber and the shorter as the outlet, since this secures the best heat transfer from the gases. It has indeed been found that, unless the chamber 22 is kept very short, the gases in it tend to be warmed by their contact with the corrugated metal structure to a point higher than the temperature of the gases entering chamber 22 from passages 29. For this reason it is desirable to maintain the difference between the lengths of the chambers somewhat greater than what would be chosen under constant temperature conditions.

Figs. 6 and 7 show a modified structure. In this type of construction the outer casing 35 is provided with annular headers 36, 37 to the inside of which are secured shells 38 and 39 having partitions 40, 41 at their ends. The annular headers are also joined by a series of tubes 42. The space bounded by the shells 38, 39, the casing 35, and the headers 36, 37 forms a water jacket which also extends between the partitions 40, 41. Water may be admitted to the jacket as through a pipe 43 and water or steam is drawn off through a pipe 44. This construction assists in taking care of differential expansion between shell 38 and tubes 42. The spaces within the shells 38 and 39 form chambers 45 and 46 to and from which exhaust gas is led through conduits 47 and 48, passing from one of the conduits (preferably 47) through chamber 45, tubes 42, and chamber 46 to conduit 48. Since it is desirable that the device be mounted on a slant to facilitate drainage the conduits 47 and 48 are eccentrically positioned and their connecting flanges placed at an angle as shown so that they will be parallel to each other.

Figs. 8 and 9 show a further modification having advantages in some instances. In this case the channels 50 next to the intermediate shell 51 are formed by a series of angle irons 52 welded to the shell and to each other at 53. A further feature is the provision of a shell 55 extending through the partition 56 into at least one of the chambers, thus forming a second series of channels 57. This increases the area of the gas passages, and is of value in the larger sizes to avoid the increase in weight which would result were the increase in area to be obtained from the use of larger angle irons only. It should be noted that where the shell 55 extends into one only of the chambers the channels in this second series are shorter than those in the first series, and act to by-pass some of the gas from one of the chambers to the other through a path different from that followed by the remainder of the gas. This has some acoustical advantage and somewhat decreases the back pressure. It should also be noted that the walls of all channels are in heat conducting relation to the shell 51 through the metal of the angle irons. In this modification one or more partitions 58 have been added in the water jacket 59, and separate water conducting pipes 60 placed in each section. In this way one or more sections may be used in accordance with the requirements for hot water or steam.

Fig. 10 shows a further modification in the manner of producing the channeled structure, angle irons 61 being set on edge and welded at 62 to the shell 63 and at 64 to each other.

Fig. 11 illustrates a method of mounting the device in circuit with a steam drum in such a manner that the supply of water will be adjusted in proportion to the demand for steam. The combined silencer and heater 65, which may be of any of the types described above, is carried on supports 66 and has its conduits connected in an exhaust line 67. Water is supplied to the water jacket from a drum 68 through a pipe 69, and steam is led from the jacket to the drum through a pipe 70. By a pressure regulating valve 71, controlled either manually or automatically by an electrical connection 72 from the steam drum, the water in the jacket will be forced back through pipe 69 into the drum if the pressure exceeds that for which the device is set. It should be remembered that, in distinction from the usual boiler, the present device is adapted to run either wet or dry. The water in receding will uncover the heating surface and reduce the boiler output to equal the steam demand; as the steam demand increases the pressure in the drum will drop and the pressure valve 71 will open, relieving the pressure in the boiler and allowing the water to flow back into it from the drum to cover sufficient heating surface to meet the increased steam demand.

What we claim is:

1. A combined waste heat utilizer and silencer comprising a pair of axially separated expansion chambers, conduits extending into said chambers and provided with discharge passages distributed linearly thereof, said chambers having a generally cylindrical outer common wall, a shell surrounding said outer common wall and forming therewith a water jacket, said jacket being provided with a water inlet and a water outlet, and a structure extending the major portion of the combined length of the two chambers so as to overlap said conduits and comprising a plurality of elongated segments arched in cross section and joined to each other and to said wall in heat transferring relation, said structure forming a gas conduit between the chambers and receiving heat from the gas on both surfaces so as to transfer said heat to the water in the water jacket through the common wall.

2. A combined waste heat utilizer and silencer comprising a shell, end headers and a partition enclosing a pair of axially separated chambers, a water jacket surrounding the chambers, said water jacket having a water inlet and a water outlet, and a plurality of angle irons welded at their edges to said shell and extending between the chambers to form a plurality of gas conducting passages for conducting gases from one chamber to the other, said passages having their walls in heat conducting relation with the shell.

3. A combined waste heat utilizer and silencer comprising a shell, end headers and a partition enclosing a pair of axially separated chambers, a water jacket surrounding the chambers, said water jacket having a water inlet and a water outlet, and a plurality of angle irons each mounted with one leg at right angles to the shell and welded at one edge to the shell and at the other to the adjacent angle, to form a plurality of gas conducting passages for conducting gases from one chamber to the other, said passages having their walls in heat conducting relation with the shell.

4. A combined waste heat utilizer and silencer comprising a metal shell, end headers and a partition enclosing a pair of axially separated chambers, a water jacket surrounding the shell, said water jacket having a water inlet and a water outlet, a second metal shell within the first, and a plurality of metal partitions arranged in zigzag formation between the shells, to form a plurality of heat conducting passages between the chambers for conducting gases from one chamber to the other, said passages having their walls in heat conducting relation with the first shell.

5. A combined waste heat utilizer and silencer comprising a metal shell, end headers and a partition separating the space within the shell into a pair of axially spaced chambers, a water jacket surrounding the shell, said water jacket having a water inlet and a water outlet, a second metal shell within the first extending from a point spaced from one end header to and through the partition, and a plurality of metal partitions arranged in zig-zag formation between and in contact with the shells, said zig-zag partitions extending beyond the inner shell a substantial distance towards the second end header, said zig-zag partitions forming a plurality of passages for conducting gases from one chamber to the other, and conduits for inlet and exhaust of gas from said chambers.

6. A waste heat utilizer and silencer having a cylindrical casing, a transverse partition within the casing dividing it into two chambers, an open-ended inlet tube entering one of the chambers and extending part way throughout its length, an open-ended outlet tube entering the other of the chambers and extending partway throughout its length, a conduit-defining corrugated metal structure adjacent the outer cylindrical wall of the casing and extending past the partition and partway throughout the length of each chamber to form a plurality of passages connecting the two chambers, and a water jacket surrounding the cylindrical wall of the casing to absorb heat from gases directed against said wall by the corrugated metal structure.

7. A waste heat utilizer and silencer having a cylindrical casing, a transverse partition within the casing dividing it into two chambers, an open-ended inlet tube entering one of the chambers and extending partway throughout its length, an open-ended outlet tube entering the other of the chambers and extending partway throughout its length, said tubes having lateral escape openings formed in their walls, a conduit-defining corrugated metal structure adjacent the outer cylindrical wall of the casing and extending past the partition and partway throughout the length of each chamber to form a plurality of passages connecting the two chambers, and a water jacket surrounding the cylindrical wall of the casing to absorb heat from gases directed against said wall by the corrugated metal structure.

8. A waste heat utilizer and silencer having a cylindrical casing, a water-jacketed transverse partition within the casing dividing it into two chambers, an open-ended inlet tube entering one of the chambers and extending partway throughout its length, an open-ended outlet tube entering the other of the chambers and extending partway throughout its length, a conduit-defining corrugated metal structure adjacent the outer cylindrical wall of the casing and extending past the partition and partway throughout the length of each chamber to form a plurality of passages connecting the two chambers, and a water jacket surrounding the cylindrical wall of the casing to absorb heat from gases directed against said wall by the corrugated metal structure, said water jacket being in communication with the water jacket of the transverse partition.

9. A waste heat utilizer and silencer having a cylindrical casing, a water-jacketed transverse partition within the casing dividing it into two chambers, an open-ended inlet tube entering one of the chambers and extending partway throughout its length, an open-ended outlet tube entering the other of the chambers and extending partway throughout its length, said tubes having lateral escape openings formed in their walls, a conduit-defining corrugated metal structure adjacent the outer cylindrical wall of the casing and extending past the partition and partway throughout the length of each chamber to form a plurality of passages connecting the two chambers, and a water jacket surrounding the cylindrical wall of the casing to absorb heat from gases directed against said wall by the corrugated metal structure, said water jacket being in communication with the water jacket of the transverse partition.

10. A combined waste heat utilizer and silencer comprising a pair of axially separated chambers, an unrestricted inlet conduit extending a substantial distance into one of the chambers and having an open end therein, an unrestricted outlet conduit extending a substantial distance into the second chamber and having an open end therein, said conduits having one or more lateral discharge openings in that portion of their walls lying within their respective chambers, a wall structure defining a plurality of gas passages in circumferential array and having a common outer cylindrical wall, each of said passages having open ends within each of said chambers and substantially overlapping said conduits, and means for confining water in heat conducting relation to the outer surface of said cylindrical wall.

11. A combined waste heat utilizer and silencer having a cylindrical casing, a transverse partition within the casing dividing it into two chambers, an open-ended inlet tube entering one of the chambers and extending partway throughout its length, an open-ended outlet tube entering the other of the chambers and extending partway throughout its length, the cylindrical wall of said casing being provided interiorly with a plurality of extended heating surfaces forming with said cylindrical wall a circumferential array of gas conducting passages contiguous to said wall, said passages each extending past the partition and partway throughout the length of each chamber and having an end opening into each of said chambers and collectively forming a connection between them of an area on the order of the area of the said conduits, and a water jacket surrounding said cylindrical wall to absorb heat from the gases in contact with said cylindrical wall and said extended heating surfaces.

FELIX SACO, Jr.
WILLIAM R. WILLIAMSON.